US011362398B2

(12) United States Patent
Saruwatari et al.

(10) Patent No.: US 11,362,398 B2
(45) Date of Patent: Jun. 14, 2022

(54) NONAQUEOUS ELECTROLYTE BATTERY, BATTERY PACK AND POSITIVE ELECTRODE

(71) Applicant: KABUSHIKI KAISHA TOSHIBA, Minato-ku (JP)

(72) Inventors: Hidesato Saruwatari, Kawasaki (JP); Masataka Shikota, Kashiwazaki (JP); Dai Yamamoto, Kashiwazaki (JP); Genki Yamagishi, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 236 days.

(21) Appl. No.: 16/708,559

(22) Filed: Dec. 10, 2019

(65) Prior Publication Data

US 2020/0112011 A1 Apr. 9, 2020

Related U.S. Application Data

(63) Continuation of application No. 15/453,623, filed on Mar. 8, 2017, now Pat. No. 10,541,398, which is a continuation of application No. PCT/JP2015/080725, filed on Oct. 30, 2015.

(30) Foreign Application Priority Data

Oct. 31, 2014 (JP) ................................ 2014-223068

(51) Int. Cl.
| H01M 50/44 | (2021.01) |
| H01M 4/505 | (2010.01) |
| H01M 4/485 | (2010.01) |
| H01M 50/429 | (2021.01) |
| H01M 50/411 | (2021.01) |
| H01M 50/431 | (2021.01) |
| H01M 4/525 | (2010.01) |
| H01M 4/131 | (2010.01) |
| H01M 10/0525 | (2010.01) |
| H01M 10/0567 | (2010.01) |
| H01M 4/02 | (2006.01) |

(52) U.S. Cl.
CPC .......... *H01M 50/44* (2021.01); *H01M 4/131* (2013.01); *H01M 4/485* (2013.01); *H01M 4/505* (2013.01); *H01M 4/525* (2013.01); *H01M 10/0525* (2013.01); *H01M 10/0567* (2013.01); *H01M 50/411* (2021.01); *H01M 50/4295* (2021.01); *H01M 50/431* (2021.01); *H01M 2004/021* (2013.01)

(58) Field of Classification Search
None
See application file for complete search history.

(56) References Cited

U.S. PATENT DOCUMENTS

| 4,529,677 A | 7/1985 | Bodendorf |
| 4,618,401 A | 10/1986 | Bodendorf |
| 2004/0033421 A1 | 2/2004 | Ujiie et al. |
| 2005/0074675 A1 | 4/2005 | Nishijima et al. |
| 2006/0019164 A1 | 1/2006 | Bonhomme et al. |
| 2010/0151325 A1 | 6/2010 | Kasamatsu et al. |
| 2012/0282524 A1 | 11/2012 | Kono et al. |
| 2013/0330613 A1 | 12/2013 | Saruwatari et al. |
| 2016/0380257 A1 | 12/2016 | Saruwatari et al. |

FOREIGN PATENT DOCUMENTS

| CN | 103314471 A | 9/2013 |
| EP | 2 677 572 A1 | 12/2013 |
| GB | 2 117 172 A | 10/1983 |
| JP | 58-155651 | 9/1983 |
| JP | 2001-126766 | 5/2001 |
| JP | 2001-283821 | 10/2001 |
| JP | 2002-190291 | 7/2002 |
| JP | 2002-319434 | 10/2002 |
| JP | 2003-59481 A | 2/2003 |
| JP | 2006-4536 A | 1/2006 |
| JP | 2006-19191 | 1/2006 |
| JP | 2006-040896 A | 2/2006 |
| JP | 2008-4536 | 1/2008 |
| JP | 2010-65088 | 3/2010 |
| JP | 2011-16973 A | 1/2011 |
| JP | 2011-233354 | 11/2011 |

(Continued)

OTHER PUBLICATIONS

International Search Report dated Jan. 12, 2016 in PCT/JP2015/080725, filed on Oct. 30, 2015 (with English Translation).
Written Opinion dated Jan. 12, 2016 in PCT/JP2015/080725, filed on Oct. 30, 2015.
Genji Jinbo et al., "Fine particles handbook," Asakura Bookstore, Sep. 1991, pp. 9 (with English Translation).
Sohachiro Hayakawa "Powders properties of matter assay," Asakura Bookstore, Oct. 1973, pp. 9 (with English Translation).
Office Action dated May 30, 2017 in Japanese Patent Application No. 2016-556654.

*Primary Examiner* — Laura Weiner
(74) *Attorney, Agent, or Firm* — Oblon, McClelland, Maier & Neustadt, L.L.P.

(57) ABSTRACT

According to one embodiment, there is provided a nonaqueous electrolyte battery including a positive electrode, a negative electrode, a nonaqueous electrolyte and a separator. The positive electrode includes a positive electrode active material containing $Li_xNi_{1-a-b}Co_aMn_bM_cO_2$ (0.9<x≤1.25, 0<a≤0.4, 0≤b≤0.45, 0≤c≤0.1, and M represents at least one element selected from the group consisting of Mg, Al, Si, Ti, Zn, Zr, Ca, and Sn). The separator includes polyester. A pore volume in a pore size distribution according to a mercury intrusion porosimetry is in a range of 0.9 cm$^3$/g to 3 cm$^3$/g. An air permeability value according to a Gurley method is in a range of 2 sec/100 ml to 15 sec/100 ml.

4 Claims, 4 Drawing Sheets

(56) References Cited

FOREIGN PATENT DOCUMENTS

| JP | 2011-238427 | 11/2011 |
|----|-------------|---------|
| JP | 2014-63753 | 4/2014 |
| JP | 2014-192146 A | 10/2014 |
| JP | 2014-225372 | 12/2014 |
| JP | 2015-170578 A | 9/2015 |
| WO | WO 2012/086273 A1 | 6/2012 |
| WO | WO 2012/111813 A1 | 8/2012 |

NONAQUEOUS ELECTROLYTE BATTERY, BATTERY PACK AND POSITIVE ELECTRODE

CROSS-REFERENCE TO RELATED APPLICATIONS

This application is a Continuation application Ser. No. 15/453,623, filed Mar. 8, 2017, now U.S. Pat. No. 10,541,398; which is a Continuation Application of PCT Application No. PCT/JP2015/080725, filed Oct. 30, 2015 and based upon and claiming the benefit of priority from Japanese Patent Application No. 2014-223068, filed Oct. 31, 2014, the entire contents of all of which are incorporated herein by reference.

FIELD

Embodiments of the present invention relate to a nonaqueous electrolyte battery, a battery pack and a positive electrode.

BACKGROUND

Since polyester has a high melting point and high oxidation resistance, and further has low hydrophilicity, it is useful as a material of a separator for a nonaqueous electrolyte battery. However, on the other hand, a separator made of polyester hydrolyzes in a basic condition, and therefore the separator has a defect that a battery resistance increases due to the hydrolysis of the separator when the separator is used together with an active material containing a large amount of residual alkali components.

DETAILED DESCRIPTION

According to one embodiment, there is provided a nonaqueous electrolyte battery including a positive electrode, a negative electrode, a separator and a nonaqueous electrolyte. The positive electrode includes a positive electrode active material containing $Li_xNi_{1-a-b}Co_aMn_bM_cO_2$ (0.9<x≤1.25, 0<a≤0.4, 0≤b≤0.45, 0≤c≤0.1, and M represents at least one element selected from the group consisting of Mg, Al, Si, Ti, Zn, Zr, Ca, and Sn). The separator is disposed between the positive electrode and the negative electrode. The separator includes polyester. A pore volume in a pore size distribution according to a mercury intrusion porosimetry of the separator is in a range of 0.9 cm³/g to 3 cm³/g. An air permeability value according to a Gurley method of the separator is in a range of 2 sec/100 ml to 15 sec/100 ml.

According to another embodiment, there is provided a battery pack including the nonaqueous electrolyte battery according to the embodiment.

According to another embodiment, there is provided a positive electrode for a battery to be used with a negative electrode and a separator. The positive electrode includes a current collector and a positive electrode active material. The positive electrode active material contains $Li_xNi_{1-a-b}Co_aMn_bM_cO_2$ (0.9<x≤1.25, 0<a≤0.4, 0≤b≤0.45, 0≤c≤0.1, and M represents at least one element selected from the group consisting of Mg, Al, Si, Ti, Zn, Zr, Ca, and Sn).

Hereinafter, embodiments will be described with reference to the drawings.

First Embodiment

The inventors found that life characteristics of a nonaqueous electrolyte battery are improved by using a positive electrode containing a positive electrode active material containing $Li_xNi_{1-a-b}Co_aMn_bM_cO_2$ (0.9<x≤1.25, 0<a≤0.4, 0≤b≤0.45, 0≤c≤0.1, and M represents at least one element selected from the group consisting of Mg, Al, Si, Ti, Zn, Zr, Ca, and Sn), and using a separator containing polyester and satisfying the condition that a pore volume obtained from a pore size distribution according to a mercury intrusion porosimetry is in a range of 0.9 to 3 cm³/g and an air permeability value according to a Gurley method (JIS-P-8117) is in a range of 2 to 15 sec/100 ml.

In polyester, the thermal stability is excellent since the melting point is higher than that of polyolefin as one of separator materials, and, in addition, the amount of water brought into a battery can be reduced since the hydrophilicity is lower than that of cellulose as one of separator materials; therefore, polyester is preferable as a main component of a separator for a nonaqueous electrolyte battery.

Here, it is known that a positive electrode active material represented by $Li_xNi_{1-a-b}Co_aMn_bM_cO_2$ contains a large amount of residual alkali components. When a separator containing polyester is included in a nonaqueous electrolyte battery using the positive electrode active material, battery resistance that will occur due to hydrolysis in the separator tends to increase. The major cause of the increase in battery resistance is clogging of the separator. The clogging of the separator can be avoided by allowing the pore volume, obtained from the pore size distribution according to the mercury intrusion porosimetry of the separator, to fall in a range of 0.9 to 3 cm³/g. If the pore volume is less than 0.9 cm³/g, there tends to occur the increase in battery resistance due to the clogging of the separator resulting from hydrolysis of polyester. On the other hand, if the pore volume is more than 3 cm³/g, a satisfactory insulating effect of a positive electrode and a negative electrode according to a separator is less likely to be obtained. The pore volume is more preferably in a range of 1 cm³/g to 2 cm³/g. The air permeability value according to the Gurley method (JIS-P-8117) of the separator is preferably in a range of 2 to 15 sec/100 ml. It is known that the air permeability value is determined by porosity in a separator, a pore diameter of the separator, a thickness of the separator, and tortuosity of the separator that is a ratio of an effective capillary length in the separator to the separator thickness. Accordingly, the tortuosity value changes depending on the change of the air permeability value, in a case that the porosity, pore diameter, and thickness of the separator are the same. That is, it is reasonable to assume that, when the air permeability value is large, the tortuosity value is large and a capillary for ions path in the separator is long and complex. If the air permeability value is more than 15 sec/100 ml, even when the pore volume is in a range of 0.9 to 3.0 cm³/g, the increase in battery resistance due to clogging tends to occur. It is inferred that, if the air permeability value is more than 15 sec/100 ml, there are small pores causing the increase in battery resistance. The small pores may be easily clogged. On the other hand, if the air permeability value is less than 2 sec/100 ml, a satisfactory insulating effect between a positive electrode and a negative electrode by a separator is less likely to be obtained. The air permeability value is more preferably in a range of 3 to 10 sec/100 ml.

Accordingly, in the battery of the present embodiment, although hydrolysis in the separator due to residual alkali components in the positive electrode active material represented by $Li_xNi_{1-a-b}Co_aMn_bM_cO_2$ occurs, since clogging of the separator due to the hydrolysis can be reduced, the increase in battery resistance can be suppressed, and the cycle life performance can be improved.

Although the separator may be made of polyester, the separator preferably contains, other than polyester, at least one kind of polymer selected from the group consisting of cellulose, polyolefin, polyamide, polyimide, and polyvinyl alcohol. This is because when polyester is hydrolyzed, a shape of a separator is easily maintained by the other components, so that the battery performance is less likely to be adversely affected.

When the thickness of the separator is in a range of 3 to 25 µm, the effect of improving the battery performances including the cycle life performance is more easily obtained.

The nonaqueous electrolyte battery preferably contains at least one kind of moisture adsorbent selected from the group consisting of a molecular sieve, silica gel, and alumina. When such a moisture adsorbent exists in a nonaqueous electrolyte battery, hydrolysis of a separator containing polyester is less likely to occur. For example, the moisture adsorbent may be directly arranged in a space in a battery or arranged by being contained in an electrode, an electrolyte solution, or a resin component in a battery.

Instead of the moisture adsorbent, or the moisture adsorbent may be contained in a battery (cell), and a moisture scavenger may be contained in a nonaqueous electrolyte. For example, the moisture scavenger may be trialkyl orthoformates, trialkyl orthoacetates, monoisocyanate compounds, tetraethylsilicate, tris(trimethylsilyl)phosphate, tris (trimethylsilyl)borate, oxalic acid, citric acid, or toluenesulfonic acid. For example, the moisture scavenger may be arranged by being contained in an electrode or an electrolyte solution.

A method of measuring the pore volume in the pore size distribution according to the mercury intrusion porosimetry will be described below.

As a measuring apparatus, Shimadzu Autopore 9520 (Autopore 9520 model manufactured by Shimadzu Corporation) or an apparatus having equivalent functions thereto is used. As a sample, an electrode is cut into a size of about 25 mm$^2$, and the resultant sample is folded to be placed in a measurement cell and, thus, to be measured under the conditions of an initial pressure of 20 kPa and a maximum pressure of 414 Mpa. The initial pressure of 20 kPa corresponds to about 3 psia and corresponds to a pressure applied to a sample having a pore diameter of about 60 µm. The maximum pressure of 414 Mpa corresponds to about 59986 psia and corresponds to a pressure applied to a sample having a pore diameter of about 0.003 µm. An average value of three samples is used as a measurement result. In organizing data, a pore specific surface area is calculated regarding a pore shape as a cylindrical shape.

The analysis principle of a mercury intrusion porosimetry is based on the Washburn's equation (B).

$$D=-4\gamma \cos \theta/P \qquad \text{Equation (B)}$$

In the equation, P is a pressure applied, D is a pore diameter, γ is the surface tension of mercury (480 dyne·cm$^{-1}$), and θ is the contact angle between mercury and the wall surface of the pore: 140°. Since γ and θ are constants, the relationship between the applied pressure P and the pore diameter D can be obtained from the Washburn's equation, and the pore diameter and the volume distribution thereof can be derived by measuring the mercury intrusion volume at that time. For the specifics on the measurement method, principle, and the like, see "Handbook of Microparticles", Genji Jimbo et al, Asakura Publishing Co., Ltd. (1991), "Method for Measurement of Physical Properties of Powders", Sohachiro Hayakawa ed., Asakura Publishing Co., Ltd. (1973), and the like.

This measurement is applied to a measurement sample to be described below. Namely, a separator is taken out from a battery and then immersed in ethyl methyl carbonate for 12 hours. During immersion, stirring is performed, if necessary, to remove Li salt, and then the dried product is used as a measurement sample. The drying temperature is set to fall within a range of a room temperature or more and 60° C. or less. When the air permeability value according to the Gurley method (JIS-P-8117) is measured, this sample is used.

The nonaqueous electrolyte battery according to the embodiment will be described in detail.

The nonaqueous electrolyte battery according to the embodiment includes a positive electrode, a negative electrode, a separator disposed between the positive electrode and the negative electrode, a nonaqueous electrolyte.

The positive electrode may include a positive electrode current collector and a positive electrode material layer (positive electrode active material-containing layer) provided on one surface or both surfaces of the positive electrode current collector.

The positive electrode material layer may contain a positive electrode active material. The positive electrode material layer may further contain an electric conductive agent and a binder, if necessary.

The positive electrode current collector may include a portion where the positive electrode material layer is not arranged on a surface. A portion of the positive electrode current collector, which is not covered with the positive electrode material layer can serve as a positive electrode tab. Alternatively, the positive electrode may include a positive electrode tab which is separate from the positive electrode current collector.

The negative electrode may include a negative electrode current collector and a negative electrode material layer (negative electrode active material-containing layer) provided on one surface or both surfaces of the negative electrode current collector.

The negative electrode material layer may contain a negative electrode active material. The negative electrode material layer may further contain an electric conductive agent and a binder, if necessary.

The negative electrode current collector may include a portion where the negative electrode material layer is not arranged on a surface. This portion can serve as a negative electrode tab. Alternatively, the negative electrode may include a negative electrode tab which is separate from the negative electrode current collector.

The separator is disposed between the positive electrode and the negative electrode. According to this constitution, the positive electrode material layer and the negative electrode material layer can face each other through the separator.

The positive electrode, the negative electrode, and the separator can constitute an electrode group. The electrode group can have various structures. For example, the electrode group can have a stack-type structure. An electrode group having the stack-type structure can be obtained by, for example, stacking a plurality of positive electrodes and negative electrodes with a separator provided between the positive electrode material layer and the negative electrode material layer. Alternatively, the electrode group can have a wound-type structure. An electrode group having the wound-type structure can be obtained by, for example, stacking a separator, a positive electrode, a separator, and a negative electrode in this order to form a laminate and winding this laminate such that the negative electrode is located outside, for example.

A nonaqueous electrolyte may be impregnated in such an electrode group.

The nonaqueous electrolyte battery according to the embodiment may further include a positive electrode terminal and a negative electrode terminal.

A portion of the positive electrode terminal is electrically connected to a portion of the positive electrode, whereby the positive electrode terminal can serve as a conductor allowing electrons to move between the positive electrode and an external circuit. The positive electrode terminal can be connected to, for example, a positive electrode current collector, particularly a positive electrode tab. Similarly, a portion of the negative electrode terminal is electrically connected to a portion of the negative electrode, whereby the negative electrode terminal can serve as a conductor allowing electrons to move between the negative electrode and an external terminal. The negative electrode terminal can be connected to, for example, a negative electrode current collector, particularly a negative electrode tab.

The nonaqueous electrolyte battery according to the embodiment may further include a container member. The container member can store the electrodes and the nonaqueous electrolyte. A portion of each of the positive electrode terminal and the negative electrode terminal can extend from the container member.

Hereinafter, each member included in the nonaqueous electrolyte battery according to the embodiment will be described.

1) Negative Electrode

As a negative electrode current collector, a metal foil or an alloy foil is used, for example. A thickness of a current collector is preferably 20 μm or less and more preferably 15 μm or less. The metal foil may be a copper foil or an aluminum foil. In the case of the aluminum foil, the aluminum foil preferably has a purity of 99% by weight or more. The alloy foil may be a stainless foil or an aluminum alloy foil. Aluminum alloy in an aluminum alloy foil preferably contains at least one kind of element selected from the group consisting of magnesium, zinc, and silicon. An alloy component preferably contains transition metals such as iron, copper, nickel, and chromium in an amount of 1% by weight or less.

Examples of a negative electrode active material include carbonaceous materials capable of inserting and extracting lithium, titanium-containing oxides, sulfides, lithium nitrides, amorphous tin oxides such as $SnB_{0.4}P_{0.6}O_{3.1}$, tin-silicon oxides such as $SnSiO_3$, silicon oxides such as $SiO$, and tungsten oxides such as $WO_3$. The carbonaceous materials may be graphite, hard carbon, soft carbon, or graphene. One or two or more kinds of negative electrode active materials may be used.

Although titanium-containing oxides, amorphous tin oxides, tin-silicon oxides, silicon oxides, and tungsten oxides do not contain lithium before charging, lithium can be contained in them by charging.

Examples of titanium-containing oxides include spinel type titanium-containing oxides, anatase type titanium-containing oxides, rutile type titanium-containing oxides, bronze type titanium-containing oxides, ramsdellite type titanium-containing oxides, orthorhombic type titanium-containing oxides, monoclinic niobium-titanium-containing oxides, and metal composite oxides containing Ti and at least one kind of element selected from the group consisting of P, V, Sn, Cu, Ni, Nb, and Fe. Examples of the metal composite oxide containing Ti and at least one kind of element selected from the group consisting of P, V, Sn, Cu, Ni, Nb, and Fe may include $TiO_2$—$P_2O_5$, $TiO_2$—$V_2O_5$, $TiO_2$—$P_2O_5$—$SnO_2$, and $TiO_2$—$P_2O_5$-MeO (Me is at least one kind of element selected from the group consisting of Cu, Ni, and Fe). It is preferable that the metal composite oxide has low crystallinity and a microstructure in which a crystal phase and an amorphous phase coexist or only an amorphous phase exists. By adopting such a microstructure, cycling performance can be significantly improved.

The composition of anatase type, rutile type, or bronze type titanium-containing oxide can be represented by $TiO_2$.

The spinel type titanium-containing oxide may be spinel type lithium titanium composite oxide. The spinel type lithium titanium composite oxide may be $Li_{4+x}Ti_5O_{12}$ (x is changed in a range of $0 \leq x \leq 3$ by charge-discharge reaction). The spinel type lithium titanium composite oxide may be used alone or mixed with other active materials. The other negative electrode active materials to be mixed may be lithium compounds capable of allowing lithium or lithium ions to be inserted and extracted. Such lithium compounds include lithium oxides, lithium sulfides, and lithium nitrides. These compounds include metal compounds which contain no lithium in an uncharged state but contain lithium when they are charged.

The ramsdellite type titanium-containing oxide may be $Li_{2+y}Ti_3O_7$ (y is changed in a range of $-1 \leq y \leq 3$ by charge-discharge reaction).

The sulfides may be titanium sulfide such as $TiS_2$, molybdenum sulfides such as $MoS_2$, or iron sulfides such as $FeS$, $FeS_2$, or $Li_xFeS_2$ ($0<x \leq 2$).

The lithium nitrides may be lithium cobalt nitride (for example, $Li_xCo_yN$, and here, $0<x<4$ and $0<y<0.5$).

The orthorhombic type titanium-containing oxides may be a compound represented by a general formula $Li_{2+w}Na_{2-x}M1_yTi_{6-z}M2_zO_{14+\delta}$ where M1 is Cs and/or K, and M2 contains at least one of Zr, Sn, V, Nb, Ta, Mo, W, Fe, Co, Mn, and Al, and $0 \leq w \leq 4$, $0 \leq x \leq 2$, $0 \leq y \leq 2$, $0 \leq z \leq 6$, and $-0.50 \leq \delta \leq 0.5$.

The monoclinic niobium-titanium-containing oxides may be a compound represented by a general formula $Li_xTi_{1-y}M3_yNb_{2-z}M4_zO_{7+\delta}$, where M3 is at least one selected from the group consisting of Zr, Si, Sn, Fe, Co, Mn, and Ni, and M4 is at least one selected from the group consisting of V, Nb, Ta, Mo, W, and Bi, and $0 \leq x \leq 5$, $0 \leq y \leq 1$, $0 < z \leq 2$, and $-0.3 \leq \delta \leq 0.3$.

Examples of the preferable negative electrode active material include spinel type titanium-containing oxides, anatase type titanium-containing oxides, rutile type titanium-containing oxides, and bronze type titanium-containing oxides. Furthermore, a negative electrode active material containing orthorhombic type titanium-containing oxide and/or monoclinic niobium-titanium-containing oxide is a preferable material.

The electric conductive agent may be carbon-containing materials such as acetylene black, ketjen black or graphite, or metal powders.

The binder may be polytetrafluoroethylene (PTFE), polyvinylidene fluoride (PVdF), fluorine-type rubbers, or styrene butadiene rubber.

It is desirable that a coating weight per unit area of a negative electrode material layer is in a range of 10 g/m$^2$ or more and 300 g/m$^2$ or less. A more preferable range is 20 g/m$^2$ or more and 200 g/m$^2$ or less.

It is desirable that a density of the negative electrode material layer is in a range of 1.5 g/cm$^3$ or more and 3.2 g/cm$^3$ or less. A more preferable range is 1.8 g/cm$^3$ or more and 2.5 g/cm$^3$ or less.

The negative electrode can be manufactured by, for example, adding an electric conductive agent and a binder to a powdery negative electrode active material, suspending the negative electrode active material, electric conductive agent, and binder in an appropriate solvent and by applying this suspension (slurry) to a current collector, followed by drying and pressing to make a band-shaped electrode.

Concerning the mixing ratio of the negative electrode active material, the electric conductive agent, and the binder on the negative electrode current collector, it is preferable that the negative electrode active material is conditioned to an amount of 73 to 98% by weight, the electric conductive agent is conditioned to an amount of 0 to 20% by weight, and the binder is conditioned to an amount of 2 to 7% by weight.

2) Positive Electrode

A positive electrode active material contains $Li_{1-x}Ni_{1-a-b-c}Co_aMn_bM1_cO_2$ ($0.9<x\leq1.25$, $0<a\leq0.4$, $0\leq b\leq0.45$, $0\leq c\leq0.1$, and M represents at least one element selected from the group consisting of Mg, Al, Si, Ti, Zn, Zr, Ca, and Sn). The positive electrode active material may contain only this oxide or may contain other kinds of active materials.

The other kinds of active materials include various oxides and sulfides. Examples thereof include manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide ($Li_xCoO_2$) lithium-nickel-cobalt composite oxide (for example, $Li_xNi_{1-y-z}Co_yM_zO_2$ (M is at least one kind of element selected from the group consisting of Al, Cr, and Fe, $0\leq y\leq0.5$, and $0\leq z\leq0.1$)), lithium-manganese-cobalt composite oxide (for example, $Li_xMn_{1-y-z}Co_yM_zO_2$ (M is at least one kind of element selected from the group consisting of Al, Cr, and Fe, $0\leq y\leq0.5$, and $0\leq z\leq0.1$)), lithium-manganese-nickel composite oxide (for example, $Li_xMn_{1/2}Ni_{1/2}O_2$), spinel type lithium-manganese-nickel composite oxide (for example, $Li_xMn_{2-y}Ni_yO_4$), lithium phosphorus oxides having an olivine structure (such as $Li_xFePO_4$, $Li_xFe_{1-y}Mn_yPO_4$, or $Li_xCoPO_4$), iron sulfate (for example, $Fe_2(SO_4)_3$), and vanadium oxide (for example, $V_2O_5$). Also, examples of the positive electrode active material include organic materials and inorganic materials such as electroconductive polymer materials, such as polyaniline or polypyrrole, disulfide type polymer materials, sulfur (S), and carbon fluoride. The above x, y and z whose preferable ranges are not described are preferably in a range of 0 or more and 1 or less.

One or plural kinds of positive electrode active materials may be used.

The electric conductive agent may be carbon black, graphite, graphene, fullerenes, or cokes. Among them, each of carbon black and graphite is preferred. The carbon black may be acetylene black, ketjen black, or furnace black. The binder may be polytetrafluoroethylene (PTFE), polyvinylidene fluoride (PVdF), polyacrylic acid, or fluorine-type rubbers.

It is desirable that a positive electrode current collector includes an aluminum foil or an aluminum alloy foil. The average crystal particle size of the aluminum foil or aluminum alloy foil is preferably 50 µm or less, more preferably 30 µm or less, and still more preferably 5 µm or less. If the average crystal particle size is 50 µm or less, the strength of the aluminum foil or aluminum alloy foil can be increased, and it is therefore possible to highly densify the positive electrode under high press pressure, whereby battery capacity can be increased.

A thickness of a current collector is preferably 20 µm or less and more preferably 15 µm or less. The purity of the aluminum foil is preferably 99% by weight or more. Aluminum alloy is preferably an alloy containing one or more kinds of elements selected from the group consisting of magnesium, zinc, and silicon. On the other hand, it is preferable that the content of transition metals such as iron, copper, nickel, or chromium is 1% by weight or less.

It is desirable that a coating weight per unit area of a positive electrode material layer is in a range of 10 g/m$^2$ or more and 300 g/m$^2$ or less. A more preferable range is 20 g/m$^2$ or more and 220 g/m$^2$ or less.

It is desirable that a density of the positive electrode material layer is in a range of 2.0 g/cm$^3$ or more and 4.5 g/cm$^3$ or less. A more preferable range is 2.8 g/cm$^3$ or more and 4.0 g/cm$^3$ or less.

The positive electrode is manufactured by, for example, adding an electric conductive agent and a binder to a positive electrode active material, suspending the positive electrode active material, electric conductive agent, and binder in an appropriate solvent and by applying this suspension to a current collector such as aluminum foil, followed by drying and pressing to make a band-shaped electrode.

Concerning the mixing ratio of the positive electrode active material, the electric conductive agent, and the binder, it is preferable for the positive electrode active material to be used in an amount of 80 to 95% by weight, for the electric conductive agent to be used in an amount of 3 to 20% by weight, and for the binder to be used in an amount of 2 to 7% by weight.

3) Nonaqueous Electrolyte

The nonaqueous electrolyte may contain a nonaqueous solvent and an electrolyte salt to be dissolved in this nonaqueous solvent. Also, a polymer may be contained in the nonaqueous solvent.

The electrolyte salt may be lithium salts such as $LiPF_6$, $LiBF_4$, $Li(CF_3SO_2)_2N$ (bistrifluoromethanesulfonylamide lithium (popular name: LiTFSI)), $LiCF_3SO_3$ (popular name: LiTFS), $Li(C_2F_5SO_2)_2N$ (bispentafluoroethanesulfonylamide lithium (popular name: LiBETI)), $LiClO_4$, $LiAsF_6$, $LiSbF_6$, lithium bis-oxalatoborate ($LiB(C_2O_4)_2$ (popular name: LiBOB)), difluoro(oxalato) lithium borate ($LiF_2BC_2O_4$), difluoro(trifluoro-2-oxide-2-trifluoro-methylpropionate(2−) −0,0) lithium borate ($LiBF_2(OCOOC(CF_3)_2)$ (popular name: $LiBF_2$(HHIB))), or lithium difluorophosphate ($LiPO_2F_2$). These electrolyte salts may be used either singly or in combination of two or more. Particularly, each of $LiPF_6$, $LiBF_4$, lithium bis-oxalatoborate ($LiB(C_2O_4)_2$ (popular name: LiBOB)), difluoro(oxalato)lithium borate ($LiF_2BC_2O_4$), difluoro(trifluoro-2-oxide-2-trifluoro-methylpropionate(2−)−O,O) lithium borate (LiBF$_2$(OCOOC(CF$_3$)$_2$) (popular name: LiBF$_2$(HHIB))), and lithium difluorophosphate (LiPO$_2$F$_2$) is preferable.

Here, the concentration of the electrolyte salt is preferably in a range of 0.5 M or more and 3 M or less. Thus, the performance when supplying a high load current can be improved.

The nonaqueous solvent may be, though not particularly limited to, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC), or dipropyl carbonate (DPC). These solvents may be used either singly or in combination of two or more. When two or more solvents are combined, these solvents are all preferably selected from those having a dielectric constant of 20 or more.

Additives may be added to this nonaqueous electrolyte. Examples of these additives include, though not particularly limited to, vinylene carbonate (VC), fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinylene carbonate, dipropylvinylene carbonate, vinylene acetate (VA), vinylene butylate, vinylene hexanate, vinylene crotonate, catechol carbonate, propane sultone, and butane sultone. One or two or more kinds of additives may be used.

This nonaqueous electrolyte preferably contains a moisture scavenger.

4) Separator

A separator contains polyester as a material. The separator may be made of only polyester or a combination of two or more kinds of materials including polyester and materials other than polyester. The materials other than polyester may be at least one kind of polymers selected from the group consisting of polyolefin, cellulose, polyester, polyvinyl alcohol, polyamide, polyimide, polytetrafluoroethylene, and vinylon. Among the materials other than polyester, each of cellulose, polyolefin, polyamide, polyimide, and polyvinyl alcohol is preferable.

In the separator, a porous film or nonwoven fabric containing polyester may be used. The porous film or nonwoven fabric may contain inorganic particles.

5) Container Member

As a container member, a laminate film having a thickness of 0.5 mm or less or a metal container having a thickness of 3 mm or less is used. The metal container preferably has a thickness of 0.5 mm or less. Alternatively, a resin container may be used. Examples of materials for a resin container include a polyolefin resin, a polyvinyl chloride resin, a polystyrene resin, an acrylic resin, a phenolic resin, a polyphenylene resin, and a fluorine resin.

The shape of the container member, that is, the battery shape may be flat type (thin type), rectangular type, cylindrical type, coin type, button type, and the like. The battery can be used in either compact applications in which it is loaded in, for example, portable electronic devices, or large applications in which it is loaded in vehicles including two-wheel or four-wheel vehicles.

As the laminate film, a multi-layered films including a metal layer between resin layers. The metal layer is preferably made from an aluminum foil or an aluminum alloy foil, because of weight saving. The resin layer may be formed using, for example, a polymer material such as polypropylene (PP), polyethylene (PE), nylone, and polyethylene terephthalate (PET). The laminate film can be heat-sealed to form into the shape of the container member.

The metal container is made from aluminum or aluminum alloy. Aluminum alloy preferably contains at least one kind of element selected from the group consisting of magnesium, zinc, and silicon and the like. When the alloy includes a transition metal such as iron, copper, nickel, or chromium, the content thereof is preferably controlled to 100 ppm or less.

6) Negative Electrode Terminal

A negative electrode terminal may include aluminum or aluminum alloy containing at least one kind of element selected from the group consisting of Mg, Ti, Zn, Mn, Fe, Cu, and Si. The negative electrode terminal is preferably made of the same material as that of the negative electrode current collector in order to reduce the contact resistance with the negative electrode current collector.

7) Positive Electrode Terminal

A positive electrode terminal preferably includes aluminum or aluminum alloy containing at least one kind of element selected from the group consisting of Mg, Ti, Zn, Ni, Cr, Mn, Fe, Cu, and Si. The positive electrode terminal is preferably made of the same material as that of the positive electrode current collector in order to reduce the contact resistance with the positive electrode current collector.

Figure 1:
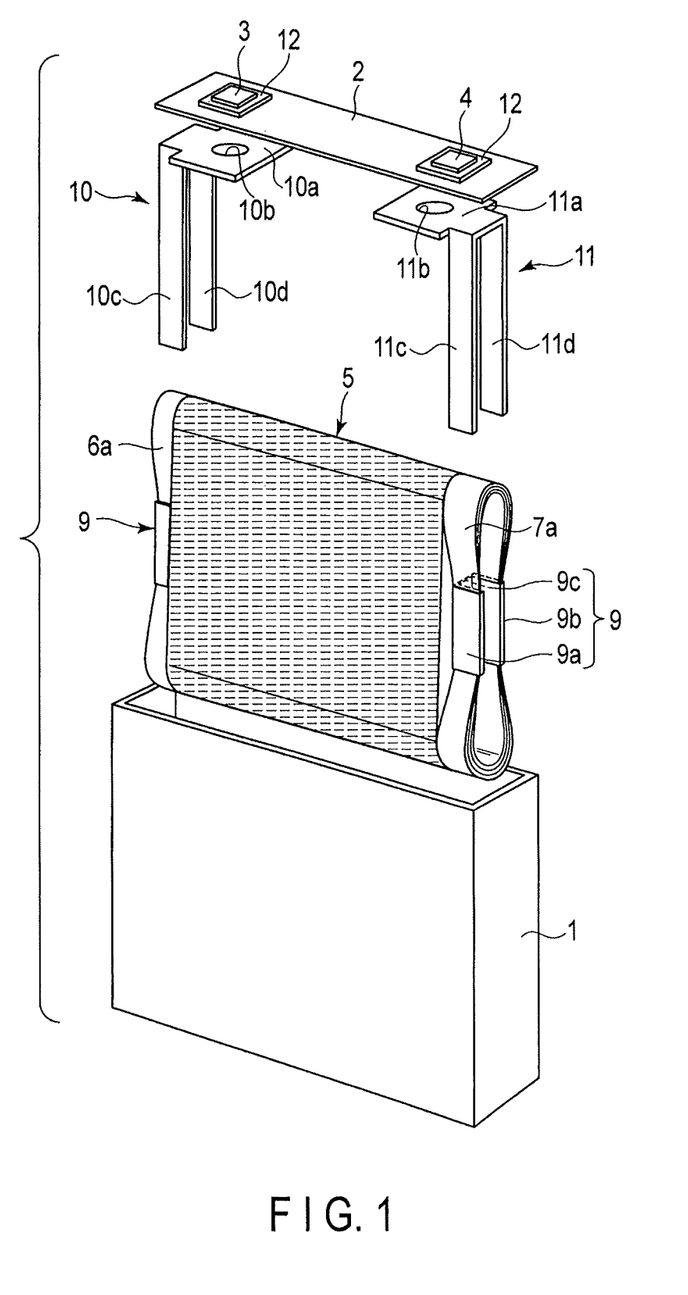
FIG. 1 is an exploded perspective view of a nonaqueous electrolyte battery according to an embodiment.

FIG. 1 shows an example of the nonaqueous electrolyte battery of the embodiment. The battery shown in FIG. 1 is a sealed prismatic nonaqueous electrolyte battery. The nonaqueous electrolyte battery includes an outer can 1, a lid 2, a positive electrode external terminal 3, a negative electrode external terminal 4, and an electrode group 5. A container member includes the outer can 1 and the lid 2.

The outer can 1 has a bottomed square cylindrical shape and is formed of, for example, metal such as aluminum, aluminum alloy, iron, or stainless steel.

Figure 2:
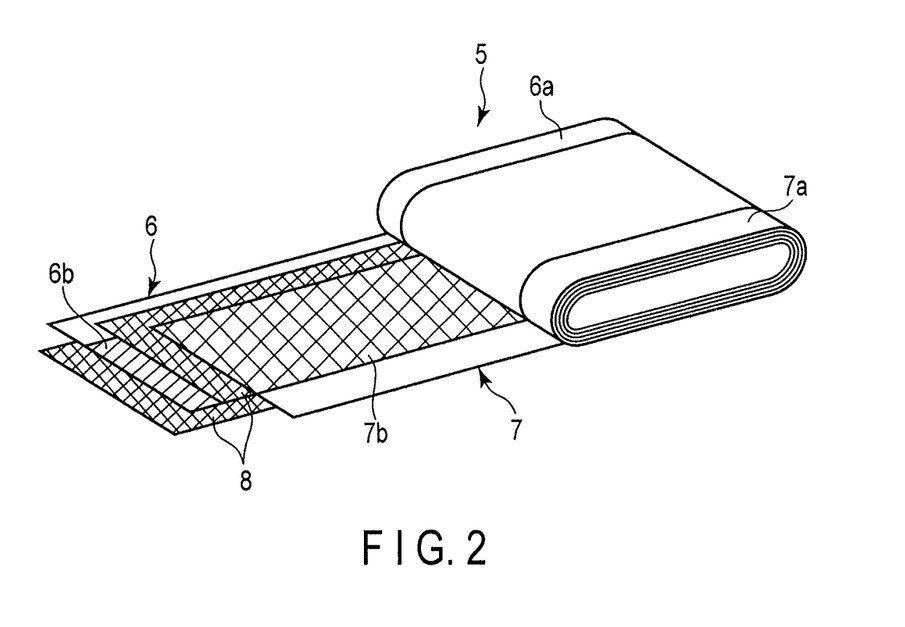
FIG. 2 is a partially developed perspective view of an electrode group used in the nonaqueous electrolyte battery of FIG. 1.

As shown in FIG. 2, a flat-type electrode group 5 is produced by winding a positive electrode 6 and a negative electrode 7 in a flat shape with a separator 8 being interposed therebetween. The positive electrode 6 includes a band-shaped positive electrode current collector made of, for example, a metal foil, a positive electrode tab 6a having one end portion parallel to the long side of the positive electrode current collector, and a positive electrode material layer (positive electrode active material-containing layer) 6b provided on the positive electrode current collector except for at least the positive electrode tab 6a. On the other hand, the negative electrode 7 includes a band-shaped negative electrode current collector made of, for example, a metal foil, a negative electrode tab 7a having one end portion parallel to the long side of the negative electrode current collector, and a negative electrode material layer (negative electrode active material-containing layer) 7b provided on the negative electrode current collector except for at least the negative electrode tab 7a.

The positive electrode 6, the separator 8, and the negative electrode 7 are wound with the positive electrode 6 and the negative electrode 7 positionally deviated such that the positive electrode tab 6a projects from the separator 8 in the winding axial direction of the electrode group and the negative electrode tab 7a projects from the separator 8 in the opposite direction. According to such winding, in the electrode group 5, as shown in FIG. 2, the spirally wound positive electrode tab 6a projects from one end surface, and the spirally wound negative electrode tab 7a projects from the other end surface. An electrolyte solution (not shown) is impregnated in the electrode group 5.

As shown in FIG. 1, the positive electrode tab 6a and the negative electrode tab 7a are divided into two bundles from the portion near the winding center of the electrode group. A conductive holding member 9 has substantially U-shaped first and second holding portions 9a and 9b, and a connecting portion 9c which electrically connects the first holding portion 9a and the second holding portion 9b. In the positive and negative electrode tabs 6a and 7a, one bundle is held by the first holding portion 9a, and the other bundle is held by the second holding portion 9b.

The positive electrode lead 10 has a substantially rectangular-shaped support plate 10a, a through hole 10b which is opened in the support plate 10a, and strip-shaped current collecting portions 10c and 10d which are configured by branching from the support plate 10a and extend downward. On the other hand, a negative electrode lead 11 has a substantially rectangular-shaped support plate 11a, a through hole 11b which is opened in the support plate 11a, and strip-shaped current collecting portions 11c and 11d which are configured by branching from the support plate 11a and extend downward.

The positive electrode lead 10 holds the holding member 9 between the current collecting portions 10c and 10d. The current collecting portion 10c is disposed at the first holding portion 9a of the holding member 9. The current collecting portion 10d is disposed at the second holding portion 9b. The current collecting portions 10c and 10d, the first and second holding portions 9a and 9b, and the positive electrode tab 6a are joined by ultrasonic welding, for example. According to this constitution, the positive electrode 6 of the electrode group 5 and the positive electrode lead 10 are electrically connected through the positive electrode tab 6a.

The negative electrode lead 11 holds the holding member 9 between the current collecting portions 11c and 11d. The current collecting portion 11c is disposed at the first holding portion 9a of the holding member 9. On the other hand, the current collecting portion 11d is disposed at the second holding portion 9b. The current collecting portions 11c and 11d, the first and second holding portions 9a and 9b, and the negative electrode tab 7a are joined by ultrasonic welding, for example. According to this constitution, the negative electrode 7 of the electrode group 5 and the negative electrode lead 11 are electrically connected through the negative electrode tab 7a.

Although the materials of the positive and negative electrode leads 10 and 11 and the holding member 9 are not limited particularly, it is desirable that they are formed of the same material as the positive and negative electrode external terminals 3 and 4. The positive electrode external terminal 3 is made of, for example, aluminum or aluminum alloy, and the negative electrode external terminal 4 is made of, for example, aluminum, aluminum alloy, copper, nickel, iron plated with nickel, or the like. For example, when an external terminal is made of aluminum or aluminum alloy, a lead is preferably made of aluminum or aluminum alloy. When the external terminal is made of copper, it is desirable that the lead is made of copper.

The lid 2 having a rectangular plate shape is seamlessly welded to an opening of the outer can 1 by, for example, a laser. The lid 2 is made of, for example, metal such as aluminum, aluminum alloy, iron, or stainless steel. It is desirable that the lid 2 and the outer can 1 are made of metal of the same kind. The positive electrode external terminal 3 is electrically connected to the support plate 10a of the positive electrode lead 10, and the negative electrode external terminal 4 is electrically connected to the support plate 11a of the negative electrode lead 11. An insulating gasket 12 is disposed between the positive electrode external terminal 3 and the lid 2 to electrically insulate the positive electrode external terminal 3 and the lid 2. An insulating gasket 12 is disposed between the negative electrode external terminal 4 and the lid 2 to electrically insulate the negative electrode external terminal 4 and the lid 2. It is desirable that the insulating gasket 12 is a resin-molded product.

According to the above-described nonaqueous electrolyte battery of the first embodiment, since the battery includes a positive electrode containing $Li_{1-x}Ni_{1-a-b-c}Co_aMn_bM1_cO_2$ and the separator in which the pore volume is in the range of 0.9 to 3 cm$^3$/g and the air permeability value is in the range of 2 to 15 sec/100 ml and which contains polyester, the charge-and-discharge cycle performance can be improved.

Second Embodiment

According to the second embodiment, a battery pack including a nonaqueous electrolyte battery is provided. As the nonaqueous electrolyte battery, the nonaqueous electrolyte battery according to the first embodiment is used. The battery pack may include one or a plurality of nonaqueous electrolyte batteries (unit cells). When the battery pack includes a plurality of unit cells, the unit cells are electrically connected in series or parallel.

Such a battery pack will be described in detail with reference to FIG. 3. A plurality of unit batteries 21 are electrically connected to each other in series to constitute a battery module 22. A positive electrode lead 23 is connected to a positive electrode terminal of the battery module 22, and its tip is inserted into a positive electrode connector 24 to electrically connect it. A negative electrode lead 25 is connected to a negative electrode terminal of the battery module 22, and its tip is inserted into a negative electrode connector 26 to electrically connect it. These connectors 24 and 26 are connected to a protective circuit 29 through wirings 27 and 28.

The thermistor 30 detects a temperature of the unit battery 21, and the detection signal thereof is transmitted to the protective circuit 29. The protective circuit 29 can interrupt a plus wiring 32a and a minus wiring 32b between the protective circuit 29 and the terminal 31 for distributing power to external devices at a predetermined condition. The predetermined condition may include, for example, a condition in which the detection temperature of the thermistor 30 is a predetermined temperature or more. Also, the predetermined condition may include a condition in which over-charge, over-discharge, and overcurrent of the unit battery 21 are detected. Each of the unit batteries 21 or the battery module is subjected to the detection of the over-charge and the like. When each of the unit batteries 21 is detected, a battery voltage may be detected, or a positive electrode potential or a negative electrode potential may be detected. In the latter case, a lithium electrode used as a reference electrode is inserted into each of the unit batteries 21. In the case of FIG. 3, wirings 33 are connected to each of the unit batteries 21 for voltage detection, and detection signals are transmitted to the protective circuit 29 through these wirings 33.

Figure 3:
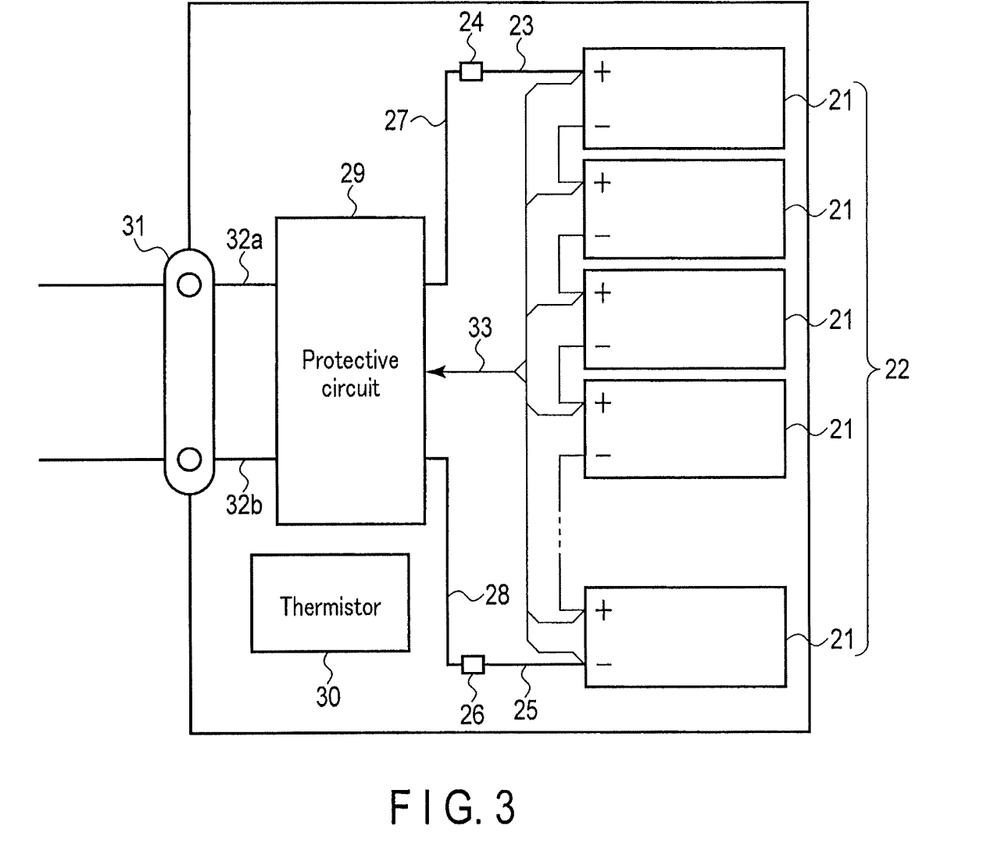
FIG. 3 is a block diagram showing an electric circuit of a battery pack according to an embodiment.

In FIG. 3, although an embodiment in which the unit batteries 21 are connected in series is described, they may be connected in parallel, for increasing a battery capacity. The battery packs may be connected in series or in parallel.

The embodiments of the battery pack may be appropriately altered depending on the application thereof. The battery pack is preferably used in applications in which cycle characteristics at large current are desired. Specific examples include power sources for digital cameras, and vehicle-mounted batteries for two- or four-wheel hybrid electric vehicles, two- or four-wheel electric vehicles, and motor-assisted bicycles. Vehicle-mounted batteries are particularly preferred. According to the battery pack of the second embodiment which has been detailed above, since the battery pack includes the nonaqueous electrolyte battery of the first embodiment, a battery pack excellent in the charge-and-discharge cycle performance can be provided.

EXAMPLES

Hereinafter, although examples will be described, the present invention is not limited to the following examples as long as not exceeding the gist thereof.

Example A1

Production of Positive Electrode>
As a positive electrode active material, $LiNi_{0.5}Co_{0.2}Mn_{0.3}O_2$ was provided. As an electric conductive agent, graphite and acetylene black were provided. As a binder, polyvinylidene fluoride (PVdF) was provided. Next, the positive electrode active material, graphite, acetylene black, and PVdF were mixed to obtain a mixture. In that case, graphite was added in an amount of 2.5% by weight based on the weight of the positive electrode material layer. Acetylene black was added in an amount of 2.5% by weight based on the weight of the positive electrode material layer. PVdF was added in an amount of 5% by weight based on the weight of the positive electrode material layer. Next, the obtained mixture was dispersed in an N-methylpyrrolidone (NMP) solvent to prepare a slurry. The obtained slurry was coated onto an aluminum foil having a thickness of 15 μm such that the coated amount per unit area was 80 g/m², and the coating was dried. Subsequently, the dried coating was pressed. Thus, a positive electrode in which the coating weight per unit area of a positive electrode material layer was 80 g/m² and which had a density of 3 g/cm³ was produced.

Production of Negative Electrode
As a negative electrode active material, spinel type lithium titanium composite oxide $Li_4Ti_5O_{12}$ was provided. As an electric conductive agent, graphite was provided. As a binder, PVdF was provided. Next, the negative electrode active material, graphite, and PVdF were mixed to obtain a mixture. In that case, graphite was added in an amount of 3% by weight based on the weight of the negative electrode material layer. PVdF was added in an amount of 2% by weight based on the weight of the negative electrode material layer. Next, the obtained mixture was mixed in an N-methylpyrrolidone (NMP) solution to prepare a slurry. The obtained slurry was coated onto a current collector made of an aluminum foil having a thickness of 15 μm such that the coated amount per unit area was 120 g/m², and the coating was dried. Subsequently, the dried coating was pressed to form a negative electrode material layer on the current collector. Thus, a band-shaped negative electrode in which the coating weight per unit area of a negative electrode material layer was 120 g/m² and which had a density of 2.1 g/cm³ was produced.

<Preparation of Nonaqueous Electrolyte>
1M concentration of $LiPF_6$ was mixed and dissolved in a nonaqueous solvent containing 33% by volume of ethylene carbonate (EC) and 67% by volume of diethyl carbonate (DEC) to prepare a nonaqueous electrolyte solution as a nonaqueous electrolyte.

<Assembly of Battery>
A separator made of a polyester nonwoven fabric having a thickness of 20 μm was provided. When the pore volume of that separator in a pore size distribution analysis according to a mercury intrusion porosimetry was obtained by the above-described method, the pore volume was 1.5 cm³/g, and the air permeability value according to the Gurley method (JIS-P-8117) was 8 sec/100 ml.

The previously prepared nonaqueous electrolyte was immersed in this separator. Subsequently, the previously produced positive electrode was covered with this separator, and then the previously produced negative electrode was staked to face the positive electrode through the separator, whereby a laminate was obtained. The laminate was wound spirally to produce a spiral-shaped electrode group. The electrode group was pressed to be formed into a flat shape.

The flat-shaped electrode group was inserted into a bottomed rectangular cylindrical can made of aluminum having a thickness of 0.3 mm, and the can was sealed with a lid member. Thus, a flat-type nonaqueous electrolyte secondary battery having a thickness of 5 mm, a width of 30 mm, a height of 25 mm, and a weight of 100 g was manufactured.

Examples A2 to A12 and B1 to B9 and Comparative Examples A1 to 4 and B1 to B9

Secondary batteries similar to Example A1 were manufactured except that the materials, thicknesses, pore volumes in the pore size distribution analysis according to the mercury intrusion porosimetry, and air permeabilities according to the Gurley method of separators, electrolyte solution compositions, presence of a moisture adsorbent in the batteries, and compositions of positive electrodes shown in Tables 1 to 4 were used.

Examples B10 to B17 and Comparative Examples B10 to B17

Secondary batteries similar to Example A1 were manufactured except that the materials, thicknesses, pore volumes in the pore size distribution analysis according to the mercury intrusion porosimetry, and air permeabilities according to the Gurley method of separators, electrolyte solution compositions, presence of a moisture adsorbent in the batteries, compositions of positive electrodes, and compositions of negative electrodes shown in Tables 5 to 8 were used.

Each moisture adsorbent in Examples A-7 to A-9 was arranged in a cell by the following method. Powders of a molecular sieve, silica gel, and alumina as moisture adsorbents were subjected to vacuum drying at 200° C. to remove moisture. 2 wt % of the moisture adsorbent from which the moisture was removed was added to an electrolyte solution in a glove box in which the dew point was managed such that the dew point was less than minus 60° C., and the resultant electrolyte solution mixed with the moisture adsorbent was injected into a cell to dispose the moisture adsorbent in the cell.

The obtained secondary battery was brought into a state in which a depth of discharge (DOD) was 50%, subjected to resistance measurement under an environment of 25° C., then stood under an environment of 70° C. for 30 days, and subsequently subjected to resistance measurement under an environment of 25° C. to measure the resistance increase rate. The measurement results are shown in Tables 2 and 4.

Figure 4:
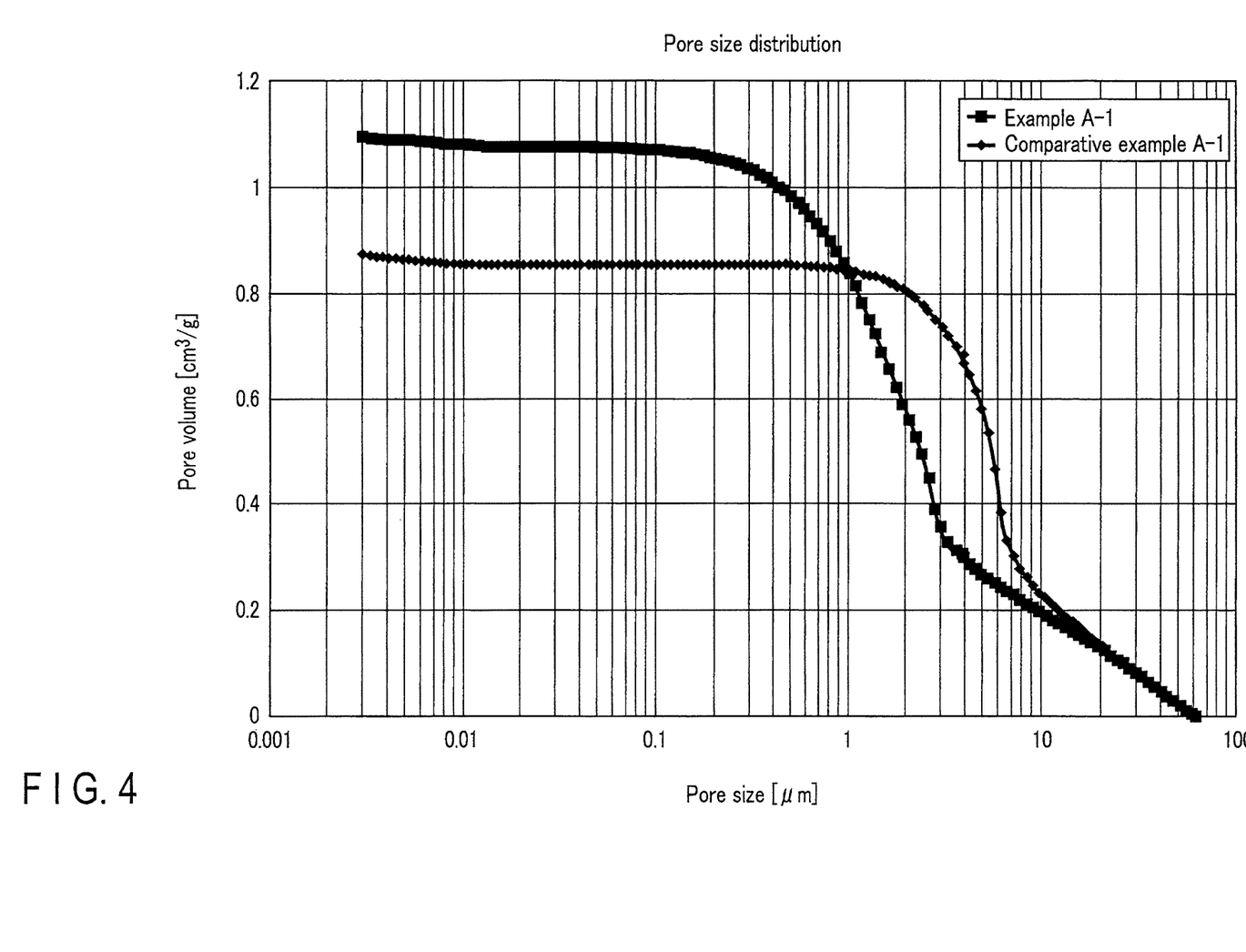
FIG. 4 is a view showing pore size distributions according to a mercury intrusion porosimetry of separators used in Example A-1 and Comparative Example A-1.

FIG. 4 shows the pore size distribution in Example A-1 and Comparative Example A-1. In FIG. 4, the horizontal axis represents the pore size (μm), and the vertical axis represents the pore volume (cm³ g).

As seen in FIG. 4, in the separator used in the battery of Example A-1, the volume of pores having a pore size of 1 μm or less is larger than that in Comparative Example A-1.

TABLE 1

| | Positive electrode | | | Negative electrode | | | Separator | | | |
|---|---|---|---|---|---|---|---|---|---|---|
| | Active Material | Coating weight per unit area g/m² | Density g/cm³ | Active Material | Coating weight per unit area g/m² | Density g/cm³ | Material | Thickness μm | Pore volume cm³/g | Air permeability sec/100 ml |
| Example A-1 | $LiNi_{0.5}Co_{0.2}Mn_{0.3}O_2$ | 80 | 3 | $Li_4Ti_5O_{12}$ | 120 | 2.1 | Polyester | 20 | 1.5 | 8 |
| Example A-2 | $LiNi_{0.5}Co_{0.2}Mn_{0.3}O_2$ | 80 | 3 | $Li_4Ti_5O_{12}$ | 120 | 2.1 | Polyester | 20 | 0.9 | 8 |
| Example A-3 | $LiNi_{0.5}Co_{0.2}Mn_{0.3}O_2$ | 80 | 3 | $Li_4Ti_5O_{12}$ | 120 | 2.1 | Polyester | 20 | 3 | 8 |
| Example A-4 | $LiNi_{0.5}Co_{0.2}Mn_{0.3}O_2$ | 80 | 3 | $Li_4Ti_5O_{12}$ | 120 | 2.1 | Polyester | 20 | 1.5 | 2 |
| Example A-5 | $LiNi_{0.5}Co_{0.2}Mn_{0.3}O_2$ | 80 | 3 | $Li_4Ti_5O_{12}$ | 120 | 2.1 | Polyester | 20 | 1.5 | 15 |
| Example A-6 | $LiNi_{0.5}Co_{0.2}Mn_{0.3}O_2$ | 80 | 3 | $Li_4Ti_5O_{12}$ | 120 | 2.1 | Polyester | 20 | 1.5 | 8 |
| Example A-7 | $LiNi_{0.5}Co_{0.2}Mn_{0.3}O_2$ | 80 | 3 | $Li_4Ti_5O_{12}$ | 120 | 2.1 | Polyester | 20 | 1.5 | 8 |
| Example A-8 | $LiNi_{0.5}Co_{0.2}Mn_{0.3}O_2$ | 80 | 3 | $Li_4Ti_5O_{12}$ | 120 | 2.1 | Polyester | 20 | 1.5 | 8 |
| Example A-9 | $LiNi_{0.5}Co_{0.2}Mn_{0.3}O_2$ | 80 | 3 | $Li_4Ti_5O_{12}$ | 120 | 2.1 | Polyester | 20 | 1.5 | 8 |
| Example A-10 | $LiNi_{0.5}Co_{0.2}Mn_{0.3}O_2$ | 80 | 3 | $Li_4Ti_5O_{12}$ | 120 | 2.1 | Nonwoven fabric of mixture of polyester and cellulose (67:33)(weight ratio) | 20 | 1.5 | 8 |
| Example A-11 | $LiNi_{0.5}Co_{0.2}Mn_{0.3}O_2$ | 80 | 3 | $Li_4Ti_5O_{12}$ | 120 | 2.1 | Nonwoven fabric of mixture of polyester and polyethylene (67:33)(weight ratio) | 20 | 1.5 | 8 |
| Example A-12 | $LiNi_{0.5}Co_{0.2}Mn_{0.3}O_2$ | 80 | 3 | $Li_4Ti_5O_{12}$ | 120 | 2.1 | Nonwoven fabric of mixture of polyester and polypropylene (67:33)(weight ratio) | 20 | 1.5 | 8 |
| Example B-1 | $LiNi_{0.33}Co_{0.33}Mn_{0.33}O_2$ | 80 | 3 | $Li_4Ti_5O_{12}$ | 120 | 2.1 | Polyester | 20 | 1.5 | 8 |
| Example B-2 | $LiNi_{0.6}Co_{0.2}Mn_{0.2}O_2$ | 75 | 3 | $Li_4Ti_5O_{12}$ | 120 | 2.1 | Polyester | 20 | 1.5 | 8 |
| Example B-3 | $LiNi_{0.7}Co_{0.15}Mn_{0.15}O_2$ | 70 | 3 | $Li_4Ti_5O_{12}$ | 120 | 2.1 | Polyester | 20 | 1.5 | 8 |
| Example B-4 | $LiNi_{0.8}Co_{0.1}Mn_{0.1}O_2$ | 70 | 3 | $Li_4Ti_5O_{12}$ | 120 | 2.1 | Polyester | 20 | 1.5 | 8 |
| Example B-5 | $LiNi_{0.5}Co_{0.3}Mn_{0.2}O_2$ | 80 | 3 | $Li_4Ti_5O_{12}$ | 120 | 2.1 | Polyester | 20 | 1.5 | 8 |
| Example B-6 | $LiNi_{0.85}Co_{0.1}Al_{0.05}O_2$ | 70 | 3 | $Li_4Ti_5O_{12}$ | 120 | 2.1 | Polyester | 20 | 1.5 | 8 |
| Example B-7 | $LiNi_{0.8}Co_{0.15}Al_{0.05}O_2$ | 70 | 3 | $Li_4Ti_5O_{12}$ | 120 | 2.1 | Polyester | 20 | 1.5 | 8 |
| Example B-8 | $LiNi_{0.5}Co_{0.2}Mn_{0.3}O_2$ and $LiCoO_2$(67:33) (weight ratio) | 85 | 3 | $Li_4Ti_5O_{12}$ | 120 | 2.1 | Polyester | 20 | 1.5 | 8 |
| Example B-9 | $LiNi_{0.33}Co_{0.33}Mn_{0.33}O_2$ and $LiCoO_2$(67:33) (weight ratio) | 85 | 3 | $Li_4Ti_5O_{12}$ | 120 | 2.1 | Polyester | 20 | 1.5 | 8 |

TABLE 2

| | Electrolyte solution composition | Moisture adsorbent | resistance increase rate (%) |
|---|---|---|---|
| ExampleA-1 | 1 mol-$LiPF_6$/EC:DEC(33:67) (volume ratio) | non | 10 |
| ExampleA-2 | 1 mol-$LiPF_6$/EC:DEC(33:67) (volume ratio) | non | 30 |
| ExampleA-3 | 1 mol-$LiPF_6$/EC:DEC(33:67) (volume ratio) | non | 20 |
| ExampleA-4 | 1 mol-$LiPF_6$/EC:DEC(33:67) (volume ratio) | non | 20 |
| ExampleA-5 | 1 mol-$LiPF_6$/EC:DEC(33:67) (volume ratio) | non | 20 |
| ExampleA-6 | 1 mol-$LiPF_6$/EC:DEC(33:67) (volume ratio) and 1 wt %-tris(trimethyl)phosphate | non | 5 |
| ExampleA-7 | 1 mol-$LiPF_6$/EC:DEC(33:67) (volume ratio) | Molecular sieve | 5 |
| ExampleA-8 | 1 mol-$LiPF_6$/EC:DEC(33:67) (volume ratio) | Silica gel | 5 |
| ExampleA-9 | 1 mol-$LiPF_6$/EC:DEC(33:67) (volume ratio) | Alumina | 5 |
| ExampleA-10 | 1 mol-$LiPF_6$/EC:DEC(33:67) (volume ratio) | non | 10 |
| ExampleA-11 | 1 mol-$LiPF_6$/EC:DEC(33:67) (volume ratio) | non | 10 |
| ExampleA-12 | 1 mol-$LiPF_6$/EC:DEC(33:67) (volume ratio) | non | 10 |
| ExampleB-1 | 1 mol-$LiPF_6$/EC:DEC(33:67) (volume ratio) | non | 10 |
| ExampleB-2 | 1 mol-$LiPF_6$/EC:DEC(33:67) (volume ratio) | non | 15 |
| ExampleB-3 | 1 mol-$LiPF_6$/EC:DEC(33:67) (volume ratio) | non | 15 |
| ExampleB-4 | 1 mol-$LiPF_6$/EC:DEC(33:67) (volume ratio) | non | 15 |

TABLE 2-continued

| | Electrolyte solution composition | Moisture adsorbent | resistance increase rate (%) |
|---|---|---|---|
| ExampleB-5 | 1 mol-LiPF$_6$/EC:DEC(33:67) (volume ratio) | non | 10 |
| ExampleB-6 | 1 mol-LiPF$_6$/EC:DEC(33:67) (volume ratio) | non | 20 |
| ExampleB-7 | 1 mol-LiPF$_6$/EC:DEC(33:67) (volume ratio) | non | 20 |
| ExampleB-8 | 1 mol-LiPF$_6$/EC:DEC(33:67) (volume ratio) | non | 15 |
| ExampleB-9 | 1 mol-LiPF$_6$/EC:DEC(33:67) (volume ratio) | non | 15 |

TABLE 3

| | Positive electrode | | | Negative electrode | | | Separator | | |
|---|---|---|---|---|---|---|---|---|---|
| | Active Material | Coating weight per unit area g/m$^2$ | Density g/cm$^3$ | Active material | Coating weight per unit area g/m$^2$ | Density g/cm$^3$ | Material | Thickness μm | Pore volume cm$^3$/g | Air permeability sec/100 ml |
| Comparative Example A-1 | LiNi$_{0.5}$Co$_{0.2}$Mn$_{0.3}$O$_2$ | 80 | 3 | Li$_4$Ti$_5$O$_{12}$ | 120 | 2.1 | Polyester | 20 | 0.8 | 8 |
| Comparative Example A-2 | LiNi$_{0.5}$Co$_{0.2}$Mn$_{0.3}$O$_2$ | 80 | 3 | Li$_4$Ti$_5$O$_{12}$ | 120 | 2.1 | Polyester | 20 | 3.2 | 8 |
| Comparative Example A-3 | LiNi$_{0.5}$Co$_{0.2}$Mn$_{0.3}$O$_2$ | 80 | 3 | Li$_4$Ti$_5$O$_{12}$ | 120 | 2.1 | Polyester | 20 | 1.5 | 1 |
| Comparative Example A-4 | LiNi$_{0.5}$Co$_{0.2}$Mn$_{0.3}$O$_2$ | 80 | 3 | Li$_4$Ti$_5$O$_{12}$ | 120 | 2.1 | Polyester | 20 | 1.5 | 20 |
| Comparative Example B-1 | LiNi$_{0.5}$Co$_{0.2}$Mn$_{0.3}$O$_2$ | 80 | 3 | Li$_4$Ti$_5$O$_{12}$ | 120 | 2.1 | Polyester | 20 | 0.8 | 8 |
| Comparative Example B-2 | LiNi$_{0.6}$Co$_{0.2}$Mn$_{0.2}$O$_2$ | 75 | 3 | Li$_4$Ti$_5$O$_{12}$ | 120 | 2.1 | Polyester | 20 | 0.8 | 8 |
| Comparative Example B-3 | LiNi$_{0.7}$Co$_{0.15}$Mn$_{0.15}$O$_2$ | 70 | 3 | Li$_4$Ti$_5$O$_{12}$ | 120 | 2.1 | Polyester | 20 | 0.8 | 8 |
| Comparative Example B-4 | LiNi$_{0.8}$Co$_{0.1}$Mn$_{0.1}$O$_2$ | 70 | 3 | Li$_4$Ti$_5$O$_{12}$ | 120 | 2.1 | Polyester | 20 | 0.8 | 8 |
| Comparative Example B-5 | LiNi$_{0.5}$Co$_{0.3}$Mn$_{0.2}$O$_2$ | 80 | 3 | Li$_4$Ti$_5$O$_{12}$ | 120 | 2.1 | Polyester | 20 | 0.8 | 8 |
| Comparative Example B-6 | LiNi$_{0.85}$Co$_{0.1}$Al$_{0.05}$O$_2$ | 70 | 3 | Li$_4$Ti$_5$O$_{12}$ | 120 | 2.1 | Polyester | 20 | 0.8 | 8 |
| Comparative Example B-7 | LiNi$_{0.8}$Co$_{0.15}$Al$_{0.05}$O$_2$ | 70 | 3 | Li$_4$Ti$_5$O$_{12}$ | 120 | 2.1 | Polyester | 20 | 0.8 | 8 |
| Comparative Example B-8 | LiNi$_{0.5}$Co$_{0.2}$Mn$_{0.3}$O$_2$ and LiCoO$_2$(67:33) (weight ratio) | 85 | 3 | Li$_4$Ti$_5$O$_{12}$ | 120 | 2.1 | Polyester | 20 | 0.8 | 8 |
| Comparative Example B-9 | LiNi$_{0.33}$Co$_{0.33}$Mn$_{0.33}$O$_2$ and LiCoO$_2$(67:33) (weight ratio) | 85 | 3 | Li$_4$Ti$_5$O$_{12}$ | 120 | 2.1 | Polyester | 20 | 0.8 | 8 |

TABLE 4

| | Electrolyte solution composition | Moisture adsorbent | Resistance increase rate (%) |
|---|---|---|---|
| Comparative ExampleA-1 | 1 mol-LiPF$_6$/EC:DEC(33:67) (volume ratio) | non | 60 |
| Comparative ExampleA-2 | 1 mol-LiPF$_6$/EC:DEC(33:67) (volume ratio) | non | Short circuit |
| Comparative ExampleA-3 | 1 mol-LiPF$_6$/EC:DEC(33:67) (volume ratio) | non | Short circuit |
| Comparative ExampleA-4 | 1 mol-LiPF$_6$/EC:DEC(33:67) (volume ratio) | non | 70 |
| Comparative ExampleB-1 | 1 mol-LiPF$_6$/EC:DEC(33:67) (volume ratio) | non | 60 |
| Comparative ExampleB-2 | 1 mol-LiPF$_6$/EC:DEC(33:67) (volume ratio) | non | 80 |
| Comparative ExampleB-3 | 1 mol-LiPF$_6$/EC:DEC(33:67) (volume ratio) | non | 80 |
| Comparative ExampleB-4 | 1 mol-LiPF$_6$/EC:DEC(33:67) (volume ratio) | non | 80 |
| Comparative ExampleB-5 | 1 mol-LiPF$_6$/EC:DEC(33:67) (volume ratio) | non | 60 |
| Comparative ExampleB-6 | 1 mol-LiPF$_6$/EC:DEC(33:67) (volume ratio) | non | 90 |
| Comparative ExampleB-7 | 1 mol-LiPF$_6$/EC:DEC(33:67) (volume ratio) | non | 90 |
| Comparative ExampleB-8 | 1 mol-LiPF$_6$/EC:DEC(33:67) (volume ratio) | non | 70 |
| Comparative ExampleB-9 | 1 mol-LiPF$_6$/EC:DEC(33:67) (volume ratio) | non | 70 |

TABLE 5

| | Positive electrode | | | Negative electrode | | | Separator | | |
|---|---|---|---|---|---|---|---|---|---|
| | Active Material | Coating weight per unit area g/m² | Density g/cm³ | Active Material | Coating weight per unit area g/m² | Density g/cm³ | Material | Thickness μm | Pore volume cm³/g | Air permeability sec/100 ml |
| Example B-10 | Li(Ni$_{0.5}$Co$_{0.2}$Mn$_{0.3}$)$_{0.95}$Mg$_{0.05}$O$_2$ | 80 | 3 | Li$_4$Ti$_5$O$_{12}$ | 120 | 2.1 | Polyester | 20 | 1.5 | 8 |
| Example B-11 | Li(Ni$_{0.5}$Co$_{0.2}$Mn$_{0.3}$)$_{0.95}$Si$_{0.05}$O$_2$ | 80 | 3 | Li$_4$Ti$_5$O$_{12}$ | 120 | 2.1 | Polyester | 20 | 1.5 | 8 |
| Example B-12 | Li(Ni$_{0.5}$Co$_{0.2}$Mn$_{0.3}$)$_{0.95}$Ti$_{0.05}$O$_2$ | 80 | 3 | Li$_4$Ti$_5$O$_{12}$ | 120 | 2.1 | Polyester | 20 | 1.5 | 8 |
| Example B-13 | Li(Ni$_{0.5}$Co$_{0.2}$Mn$_{0.3}$)$_{0.95}$Zn$_{0.05}$O$_2$ | 80 | 3 | Li$_4$Ti$_5$O$_{12}$ | 120 | 2.1 | Polyester | 20 | 1.5 | 8 |
| Example B-14 | Li(Ni$_{0.5}$Co$_{0.2}$Mn$_{0.3}$)$_{0.95}$Zr$_{0.05}$O$_2$ | 80 | 3 | Li$_4$Ti$_5$O$_{12}$ | 120 | 2.1 | Polyester | 20 | 1.5 | 8 |
| Example B-15 | LiNi$_{0.5}$Co$_{0.2}$Mn$_{0.3}$O$_2$ | 80 | 3 | TiO$_2$(bronze type) | 100 | 2.1 | Polyester | 20 | 1.5 | 8 |
| Example B-16 | LiNi$_{0.5}$Co$_{0.2}$Mn$_{0.3}$O$_2$ | 80 | 3 | Nb$_2$TiO$_7$ | 60 | 2.6 | Polyester | 20 | 1.5 | 8 |
| Example B-17 | LiNi$_{0.5}$Co$_{0.2}$Mn$_{0.3}$O$_2$ | 80 | 3 | Li$_2$Na$_2$Ti$_6$NbO$_{14}$ | 60 | 2.6 | Polyester | 20 | 1.5 | 8 |

TABLE 6

| | Electrolyte solution composition | Moisture adsorbent | Resistance increase rate (%) |
|---|---|---|---|
| ExampleB-10 | 1 mol-LiPF$_6$/EC:DEC(33:67) (volume ratio) | non | 10 |
| ExampleB-11 | 1 mol-LiPF$_6$/EC:DEC(33:67) (volume ratio) | non | 10 |
| ExampleB-12 | 1 mol-LiPF$_6$/EC:DEC(33:67) (volume ratio) | non | 10 |
| ExampleB-13 | 1 mol-LiPF$_6$/EC:DEC(33:67) (volume ratio) | non | 10 |
| ExampleB-14 | 1 mol-LiPF$_6$/EC:DEC(33:67) (volume ratio) | non | 10 |
| ExampleB-15 | 1 mol-LiPF$_6$/EC:DEC(33:67) (volume ratio) | non | 30 |
| ExampleB-16 | 1 mol-LiPF$_6$/EC:DEC(33:67) (volume ratio) | non | 40 |
| ExampleB-17 | 1 mol-LiPF$_6$/EC:DEC(33:67) (volume ratio) | non | 40 |

TABLE 8

| | Electrolyte solution composition | Moisture adsorbent | Resistance increase rate (%) |
|---|---|---|---|
| Comparative ExampleB-10 | 1 mol-LiPF$_6$/EC:DEC(33:67) (volume ratio) | non | 60 |
| Comparative ExampleB-11 | 1 mol-LiPF$_6$/EC:DEC(33:67) (volume ratio) | non | 60 |
| Comparative ExampleB-12 | 1 mol-LiPF$_6$/EC:DEC(33:67) (volume ratio) | non | 60 |
| Comparative ExampleB-13 | 1 mol-LiPF$_6$/EC:DEC(33:67) (volume ratio) | non | 60 |
| Comparative ExampleB-14 | 1 mol-LiPF$_6$/EC:DEC(33:67) (volume ratio) | non | 60 |
| Comparative ExampleB-15 | 1 mol-LiPF$_6$/EC:DEC(33:67) (volume ratio) | non | 90 |
| Comparative ExampleB-16 | 1 mol-LiPF$_6$/EC:DEC(33:67) (volume ratio) | non | 80 |
| Comparative ExampleB-17 | 1 mol-LiPF$_6$/EC:DEC(33:67) (volume ratio) | non | 70 |

By comparing Examples A-1 to A-3 and Comparative Examples A-1 and A-2, when the air permeability value was

TABLE 7

| | Positive electrode | | | Negative electrode | | | Separator | | |
|---|---|---|---|---|---|---|---|---|---|
| | Active Material | Coating weight per unit area g/m² | Density g/cm³ | Active Material | Coating weight per unit area g/m² | Density g/cm³ | Material | Thickness μm | Pore volume cm³/g | Air permeability sec/100 ml |
| Comparative Example B-10 | Li(Ni$_{0.5}$Co$_{0.2}$Mn$_{0.3}$)$_{0.95}$Mg$_{0.05}$O$_2$ | 80 | 3 | Li$_4$Ti$_5$O$_{12}$ | 120 | 2.1 | Polyester | 20 | 0.8 | 8 |
| Comparative Example B-11 | Li(Ni$_{0.5}$Co$_{0.2}$Mn$_{0.3}$)$_{0.95}$Si$_{0.05}$O$_2$ | 80 | 3 | Li$_4$Ti$_5$O$_{12}$ | 120 | 2.1 | Polyester | 20 | 0.8 | 8 |
| Comparative Example B-12 | Li(Ni$_{0.5}$Co$_{0.2}$Mn$_{0.3}$)$_{0.95}$Ti$_{0.05}$O$_2$ | 80 | 3 | Li$_4$Ti$_5$O$_{12}$ | 120 | 2.1 | Polyester | 20 | 0.8 | 8 |
| Comparative Example B-13 | Li(Ni$_{0.5}$Co$_{0.2}$Mn$_{0.3}$)$_{0.95}$Zn$_{0.05}$O$_2$ | 80 | 3 | Li$_4$Ti$_5$O$_{12}$ | 120 | 2.1 | Polyester | 20 | 0.8 | 8 |
| Comparative Example B-14 | Li(Ni$_{0.5}$Co$_{0.2}$Mn$_{0.3}$)$_{0.95}$Zr$_{0.05}$O$_2$ | 80 | 3 | Li$_4$Ti$_5$O$_{12}$ | 120 | 2.1 | Polyester | 20 | 0.8 | 8 |
| Comparative Example B-15 | LiNi$_{0.5}$Co$_{0.2}$Mn$_{0.3}$O$_2$ | 80 | 3 | TiO$_2$ (bronze type) | 100 | 2.3 | Polyester | 20 | 0.8 | 8 |
| Comparative Example B-16 | LiNi$_{0.5}$Co$_{0.2}$Mn$_{0.3}$O$_2$ | 80 | 3 | Nb$_2$TiO$_7$ | 60 | 2.6 | Polyester | 20 | 0.8 | 8 |
| Comparative Example B-17 | LiNi$_{0.5}$Co$_{0.2}$Mn$_{0.3}$O$_2$ | 80 | 3 | Li$_2$Na$_2$Ti$_6$NbO$_{14}$ | 60 | 2.6 | Polyester | 20 | 0.8 | 8 | a constant value in a range of 2 sec/100 ml or more and 15 sec/100 ml or less, according to Examples A-1 to A-3 in which the pore volume was 0.9 cm$^3$/g or more and 3 cm$^3$/g or less, it was found that the resistance increase rate after high temperature storage was lower than that in Comparative Example A-1 in which the pore volume was less than 0.9 cm$^3$/g. In Comparative Example A-2 in which the pore volume is more than 3 cm$^3$/g, internal short circuit occurs due to high temperature storage.

By comparing Examples A-1 and A-4 to A-5 and Comparative Examples A-3 and A-4, when the pore volume was a constant value in a range of 0.9 cm$^3$/g or more and 3 cm$^3$/g or less, according to Examples A-1 and A-4 to A-5 in which the air permeability value was 2 sec/100 ml or more and 15 sec/100 ml or less, it was found that the resistance increase rate after high temperature storage was lower than that in Comparative Example A-4 in which the air permeability value was more than 15 sec/100 ml. In Comparative Example A-3 in which the air permeability value is less than 2 sec/100 ml, internal short circuit occurs due to high temperature storage.

The results of Examples A-6 to A-12 and B-1 to B-9 showed that if a nonaqueous electrolyte contained trimethyl phosphate or if a moisture adsorbent was used, the resistance increase rate after high temperature storage could be further reduced. The results further showed that if a separator containing materials other than polyester was used or if a positive electrode active material had a different composition, the resistance increase rate after high temperature storage could be reduced.

The results of Comparative Examples B-1 to B-9 showed that when the pore volume fell outside the range of 0.9 cm$^3$/g or more and 3 cm$^3$/g or less, even if the air permeability value was in the range of 2 sec/100 ml or more and 15 sec/100 ml or less, the resistance increase rate after high temperature storage increased.

The results of Examples B-10 to B-14 also showed that when the positive electrode active material had a different composition, the resistance increase rate after high temperature storage could be reduced. The results of B-15 to B-17 showed that when a negative electrode active material was different, the resistance increase rate after high temperature storage could be reduced.

By comparing Examples B-10 to B-17 and Comparative Examples B-10 to B-17, it was confirmed that in Comparative Examples B-10 to B-17 in which the pore volume fell outside the range of 0.9 cm$^3$/g or more and 3 cm$^3$/g or less, even if the air permeability value was in the range of 2 sec/100 ml or more and 15 sec/100 ml or less, the resistance increase rate after high temperature storage was higher than that in Examples B-10 to B-17.

According to the above-described nonaqueous electrolyte battery of at least one embodiment and example, since the battery includes the positive electrode containing $Li_xNi_{1-a-b}Co_aMn_bM_cO_2$ and the separator in which the pore volume is in the range of 0.9 cm$^3$/g or more and 3 cm$^3$/g or less and the air permeability value is in the range of 2 sec/100 ml or more and 15 sec/100 ml or less and which contains polyester, the resistance increase after high temperature storage can be reduced, and a long life can be achieved even under a high temperature environment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An electrode group comprising:
   a positive electrode comprising a positive electrode active material containing $Li_xNi_{1-a-b}Co_aMn_bM_cO_2$ (0.9<x≤1.25, 0<a≤0.4, 0≤b≤0.45, 0≤c≤0.1, and M represents at least one element selected from the group consisting of Mg, Al, Si, Ti, Zn, Zr, Ca, and Sn);
   a negative electrode; and
   a separator, disposed between the positive electrode and the negative electrode, comprising polyester, in which a pore volume in a pore size distribution according to a mercury intrusion porosimetry of the separator is in a range of 0.9 cm$^3$/g to 3 cm$^3$/g, and an air permeability value according to a Gurley method of the separator is in a range of 2 sec/100 ml to 15 sec/100 ml.

2. The electrode group according to claim 1, wherein the separator further comprises at least one kind of polymer selected from the group consisting of cellulose, polyolefin, polyamide, polyimide, and polyvinyl alcohol.

3. The electrode group according to claim 2, wherein a thickness of the separator is in a range of 3 μm to 25 μm.

4. The electrode group according to claim 1, wherein the negative electrode comprises at least one kind of negative electrode active material selected from the group consisting of spinel type titanium-containing oxide, anatase type titanium-containing oxide, rutile type titanium-containing oxide, bronze type titanium-containing oxide, orthorhombic type titanium-containing oxide, and monoclinic niobium-titanium-containing oxide.

* * * * *